(12) United States Patent
Lundvall et al.

(10) Patent No.: US 7,765,389 B2
(45) Date of Patent: Jul. 27, 2010

(54) MANAGEMENT OF EXCEPTIONS AND HARDWARE INTERRUPTIONS BY AN EXCEPTION SIMULATOR

(75) Inventors: Shawn D. Lundvall, Midlothian, VA (US); Ronald M. Smith, Sr., Wappingers Falls, NY (US); Phil C. Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 11/740,185

(22) Filed: Apr. 25, 2007

(65) Prior Publication Data
US 2008/0270775 A1   Oct. 30, 2008

(51) Int. Cl.
*G06F 9/455* (2006.01)
(52) U.S. Cl. .................. 712/244; 712/222; 712/227
(58) Field of Classification Search .................. 712/222, 712/227, 244
See application file for complete search history.

(56) References Cited

U.S. PATENT DOCUMENTS

| | | | | |
|---|---|---|---|---|
| 5,696,709 | A | 12/1997 | Smith, Sr. | 364/745 |
| 5,825,678 | A | 10/1998 | Smith | 364/748 |
| 6,044,454 | A * | 3/2000 | Schwarz et al. | 712/201 |
| 6,247,117 | B1 * | 6/2001 | Juffa | 712/222 |
| 6,571,265 | B1 * | 5/2003 | Story | 708/498 |
| 6,826,682 | B1 * | 11/2004 | Rozas et al. | 712/244 |

OTHER PUBLICATIONS

"Intel® 64 and IA-32 Architectures Software Developer's Manual," vol. 1: Basic Architecture, 253665-022US, Nov. 2006.
"Intel® 64 and IA-32 Architectures Software Developer's Manual," vol. 2A: Instruction Set Reference, A-M, 253666-022US, Nov. 2006.
"Intel® Itanium® Architecture Software Developer's Manual," vol. 1: Application Architecture, Revision 2.2, Jan. 2006, Document No. 245317-005.
"Intel® Itanium® Architecture Software Developer's Manual," vol. 2: System Architecture, Revision 2.2, Jan. 2006, Document No. 245318-005.
Intel® Itanium® Architecture Software Developer's Manual, vol. 3: Instruction Set Reference, Revision 2.2, Jan. 2006, Document No. 245319-005.
"Draft Standard for Floating-Point Arithmetic P754," Draft 1.3.0, Feb. 23, 2007.
"z/Architecture—Principles of Operation," Sixth Edition, SA22-7832-05, Apr. 2007.
"z/Architecture—Preliminary Decimal-Floating-Point Architecture," SA23-2232-00, Nov. 2006.
"IEEE Standard for Binary Floating-Point Arithmetic," IEEE Std 754-1985.

(Continued)

*Primary Examiner*—William M Treat
(74) *Attorney, Agent, or Firm*—John E. Campbell; Blanche E. Schiller, Esq.; Heslin Rothenberg Farley & Mesiti P.C.

(57) ABSTRACT

Exception handling is simulated. An exception simulator is employed to simulate exceptions generated from routines simulating operations. The exception simulator provides an indication of the exception and invokes an interruption, when appropriate. The exception simulator includes an instruction invoked to handle the exception and any interruption.

24 Claims, 5 Drawing Sheets

OTHER PUBLICATIONS

"IEEE Standard for Radix-Independent Floating-Point Arithmetic," IEEE Std 854-1987.

"Densely Packed Decimal Encoding," Mike Cowlishaw, IEEE Proceedings—Computers and Digital Techniques, ISSN 1350-2387, vol. 149, No. 3, pp. 102-104, IEEE, May 2002 (Abstract Only).

"A Summary of Densely Packed Decimal Encoding," www.2.hursley.ibm.com/decimal/DPDecimal.html, 4 pages.

* cited by examiner

US 7,765,389 B2

MANAGEMENT OF EXCEPTIONS AND HARDWARE INTERRUPTIONS BY AN EXCEPTION SIMULATOR

TECHNICAL FIELD

This invention relates, in general, to processing within a processing environment, and in particular, to exception handling within the processing environment.

BACKGROUND OF THE INVENTION

Functions used during processing, such as computational functions, as well as others, may be implemented in hardware or software. If the function is implemented in hardware, as an instruction, for instance, then typically, any necessary exception detection and signaling are also implemented in hardware. Functions may also be implemented in software. If a software routine implements a function that could have been implemented in hardware, then the software routine may be said to "simulate" that hardware function.

Software routines do not have adequate control over hardware implemented exception handling. An exception is a condition that has been designated for special treatment. Examples of exceptions for floating point operations are shown in IEEE Std 754-1985, IEEE Standard For Binary Floating-Point Arithmetic; and in IEEE Std 854-1987, IEEE Standard for Radix-Independent Floating-Point Arithmetic, which are hereby incorporated herein by reference in their entirety. For example, a function may be provided to determine the square root of an operand. This operation may call for an exception if the operand is a negative number. If the routine was implemented in hardware, such exceptions may be handled by generating a machine interrupt that causes control to pass to an interrupt handling routine in the operating system. There is no mechanism available for the software routine to cause a hardware interrupt to occur in such a way that an interrupt handling routine could handle the interrupt as a software generated interrupt.

SUMMARY OF THE INVENTION

Based on the foregoing, a need exists for a capability that provides exception handling for those routines that do not have hardware implemented exception handling. As one example, a need exists for a capability that facilitates simulation of IEEE exception handling, including interruption handling.

The shortcomings of the prior art are overcome and additional advantages are provided through the provision of an article of manufacture that includes at least one computer usable medium having computer readable program code logic to simulate exception handling. The computer readable program code logic when executing performing, for instance, the following: obtaining a machine instruction for execution, the machine instruction being defined for computer execution according to a computer architecture, the machine instruction comprising an opcode; and performing a function defined by the opcode of the machine instruction, the function including, for instance, saving a portion of a control register to be used as one or more signaling indicators; placing contents of a source operand designated by the machine instruction in the control register; determining whether an interruption is to be invoked; providing an indication of an exception, in response to determining that the interruption is to be invoked, the indication specifying that the exception is a simulated exception for a routine simulating an operation; and providing a status indication, in response to determining that an interruption is not to be invoked, the status indication specifying an exception if an exception was indicated by the routine.

Methods and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for exception handling, including IEEE exception handling and interruption handling. An exception simulator is provided to handle defined exceptions, such as, for instance, invalid operation, divide by zero, overflow, underflow, and inexact exception. As used herein, an exception simulator provides functionality that is not provided directly in the machine.

The exception simulator is invoked by, for instance, a software program, in response to executing a routine (e.g., function, code, program, operation, subroutine, etc.) implemented in software. The exception simulator is provided to handle the defined exceptions, such that if one of the exceptions occurs during execution of the routine implemented in software, the exception, as well as any desired interrupts, can be properly managed. This is to address the lack of hardware implemented exception handling for software implemented routines.

For instance, assume a square root routine is implemented in software, since there is no hardware implementation provided for that operation. Further, assume that an exception simulator is provided for the software simulated square root routine, in accordance with an aspect of the present invention. The square root routine is invoked with an operand that is a negative number. The square root of a negative number generates an invalid operation exception. Thus, the exception simulator is invoked to handle the exception (e.g., provide an indication of the exception; invoke an interruption, etc.).

Figure 1:
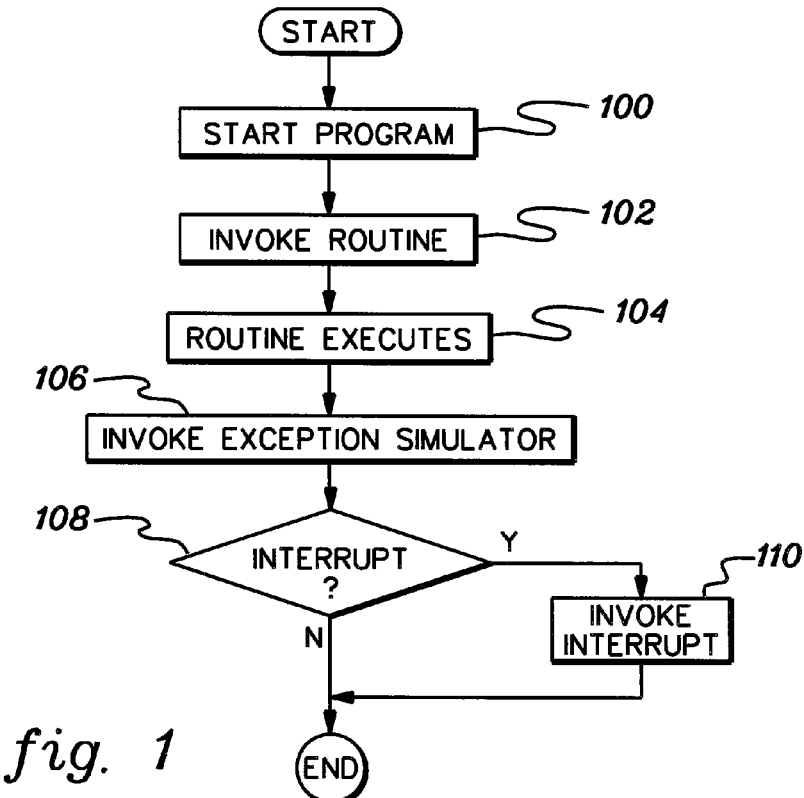
FIG. 1 depicts one embodiment of the logic associated with invoking an exception simulator used in accordance with an aspect of the present invention.

In one embodiment, the exception simulator is invoked when specified software implemented routines are executed. For instance, as depicted in FIG. 1, a software program is started, STEP 100, and during execution of the program, a software implemented routine (e.g., a square root routine) is invoked, STEP 102. The routine executes, STEP 104, and in response to completing execution of the routine, an exception simulator is invoked (e.g., Load FPC and Signal or Set FPC and signal instruction), STEP 106. In this example, the exception simulator is invoked whether or not the routine executed successfully. However, in other embodiments, the simulator is invoked only if there is an exception or only if there is a specified exception.

During execution of the exception simulator, a determination is made as to whether an interrupt is to be invoked, INQUIRY 108. If so, the hardware generates a program interruption to an operating system interrupt handler routine, STEP 110. In one example, the address of the instruction that caused the interruption is passed to the handler. The operating system handler may then invoke an application provided interrupt handler. If no interrupt is to be invoked, then processing completes as implemented.

In accordance with an aspect of the present invention, the exception simulator includes an instruction used to simulate an exception, such as an IEEE exception (e.g., invalid operation, divided by zero, overflow, underflow and inexact), as well as provide a way to simulate a data exception program interruption. Examples of instructions used to simulate an exception and possibly invoke an interruption are a Load Floating Point Control (FPC) and Signal instruction and a Set Floating Point Control (FPC) and Signal instruction.

Each of these instructions can be implemented in many architectures and may be emulated. As examples, the instruction is executed in hardware by a processor; by software executing on a processor having a native instruction set; or by emulation of a non-native instruction set that includes this instruction. In one particular example, the instruction is implemented in the z/Architecture®, offered by International Business Machines Corporation, Armonk, N.Y. z/Architecture® is a registered trademark of International Business Machines Corporation, Armonk, N.Y., U.S.A. Other names used herein may be registered trademarks, trademarks or product names of International Business Machines Corporation or other companies. One embodiment of the z/Architecture is described in "z/Architecture Principles of Operation," IBM Publication No. SA22-7832-05, 6$^{th}$ Edition, April 2007, which is hereby incorporated herein by reference in its entirety and which shows one example of each of the instructions. Further, examples of a Load Floating Point Control (FPC) and Signal instruction and a Set Floating Point Control (FPC) and Signal instruction, as well as additional details relating to decimal floating point, and in particular, a decimal floating point architecture offered by International Business Machines Corporation are described in an IBM® publication entitled "Preliminary Decimal-Floating Point Architecture," Publication No. SA23-2232-00, November 2006, which is hereby incorporated herein by reference in its entirety.

Figure 2:
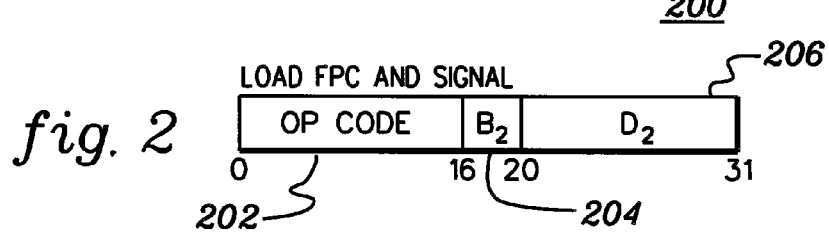
FIG. 2 depicts one embodiment of a format of a Load Floating Point Control Register and Signal instruction used in accordance with an aspect of the present invention.

One example of a format of a Load FPC and Signal instruction is described with reference to FIG. 2. In one example, a Load FPC and Signal instruction 200 is, for instance, a 32-bit instruction having an S format (an operation using an implied operand and storage) as that format is specified in the IBM® z/Architecture Principles of Operation. It includes, for instance:

An opcode 202 designating the Load FPC and Signal instruction;

A base field 204 (e.g., B$_2$, bits 16-19) designating a register used by the instruction; and A displacement field 206 (e.g., bits 20-31) designating a value.

The contents of the general register designated by the B$_2$ field are added to the contents of the D$_2$ field to form the second operand address. The second operand in storage is referred to herein as the source operand.

The Load FPC and Signal instruction uses an implied register, referred to as a floating point control register. One example of a floating point control (FPC) register is described with reference to FIG. 3.

Figure 3:
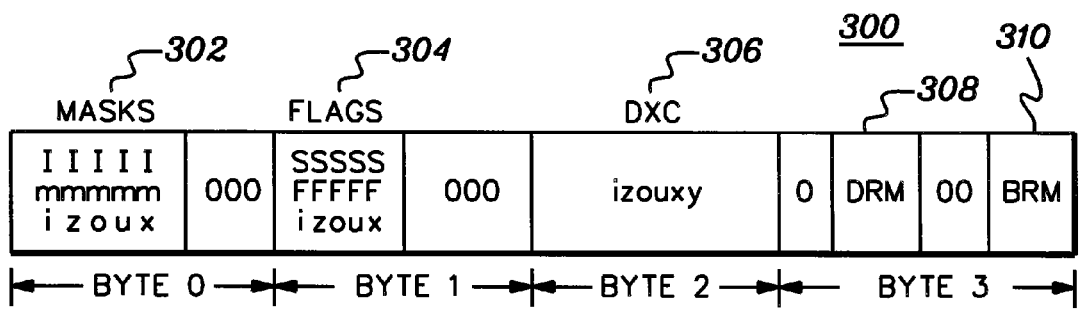
FIG. 3 depicts one example of a floating point control register used in accordance with an aspect of the present invention.

Referring to FIG. 3, a floating point control register 300 is a 32-bit register that includes masks 302, flag indicators 304, a data exception (DXC) code 306, a DFP (decimal floating point) rounding mode field 308 and a BFP (binary floating point) rounding mode field 310, each of which is described in further detail below.

For instance, the FPC register includes five mask bits and five flag bits, each corresponding to one of five IEEE exceptions that may be recognized when an IEEE computational operation is executed. An IEEE computational operation is an operation that recognizes an IEEE exception. The mask bits, when one, cause an interruption to occur if an exception is recognized. However, if the mask bit for an exception is zero, then no interruption is caused, and recognition of the exception causes a corresponding flag bit (or indicator) to be set to one. Thus, a flag bit indicates whether the corresponding exception has been recognized at least once since the program last set the flag bit to zero.

The flag bits and the FPC register are set to zero by explicit program action, initial CPU reset, clear reset or power on reset.

Byte two of the FPC register includes the data exception code which is, for instance, an 8-bit code indicating the specific cause of a data exception. In an example, if the rightmost two bits of the data exception code are ones and any of bits 0-5 of the data exception code are non-zero, this indicates that the exception is for a software implemented routine, rather than a hardware implemented routine.

The bits of the floating point control register are often referred to as, for example, FPC 1.0, meaning bit 0 of byte 1 of the register.

An example of assignments for the various bits of the FCP register is illustrated in the below table:

| Byte | Bit(s) | Name | Abbr. |
|---|---|---|---|
| 0 | 0 | IEEE invalid operation mask | IMi |
| 0 | 1 | IEEE division by zero mask | IMz |
| 0 | 2 | IEEE overflow mask | IMo |
| 0 | 3 | IEEE underflow mask | IMu |
| 0 | 4 | IEEE inexact mask | IMx |

-continued

| Byte | Bit(s) | Name | Abbr. |
|---|---|---|---|
| 0 | 5-7 | (Unassigned) | 0 |
| 1 | 0 | IEEE invalid operation flag | SFi |
| 1 | 1 | IEEE division by zero flag | SFz |
| 1 | 2 | IEEE overflow flag | SFo |
| 1 | 3 | IEEE underflow flag | SFu |
| 1 | 4 | IEEE inexact flag | SFx |
| 1 | 5-7 | (Unassigned) | 0 |
| 2 | 0-7 | Data exception code | DXC |
| 3 | 0 | (Unassigned) | 0 |
| 3 | 1-3 | DFP rounding mode | DRM |
| 3 | 4-5 | (Unassigned) | 0 |
| 3 | 6-7 | BFP rounding mode | BRM |

An example of an assignment of the bits for DFP rounding mode includes:

| FPC Byte 3 Bits 1-3 | Rounding Method |
|---|---|
| 000 | Round to nearest with ties to even |
| 001 | Round toward 0 |
| 010 | Round toward +∞ |
| 011 | Round toward −∞ |
| 100 | Round to nearest with ties away from 0 |
| 101 | Round to nearest with ties toward 0 |
| 110 | Round away from 0 |
| 111 | Round to prepare for shorter precision |

Similarly, an example of an assignment of the bits for BFP rounding mode includes:

| FPC Byte 3 Bits 6-7 | Rounding Method |
|---|---|
| 00 | Round to nearest with ties to even |
| 01 | Round toward 0 |
| 10 | Round toward +∞ |
| 11 | Round toward −∞ |

Although, in the above example, DFP rounding mode and BFP rounding mode fields are provided, if one or more of those floating point systems is not used, then the field need not be included. Further, more, less or other masks, flags, codes, modes and/or other characteristics may be included in the register.

Figure 4:
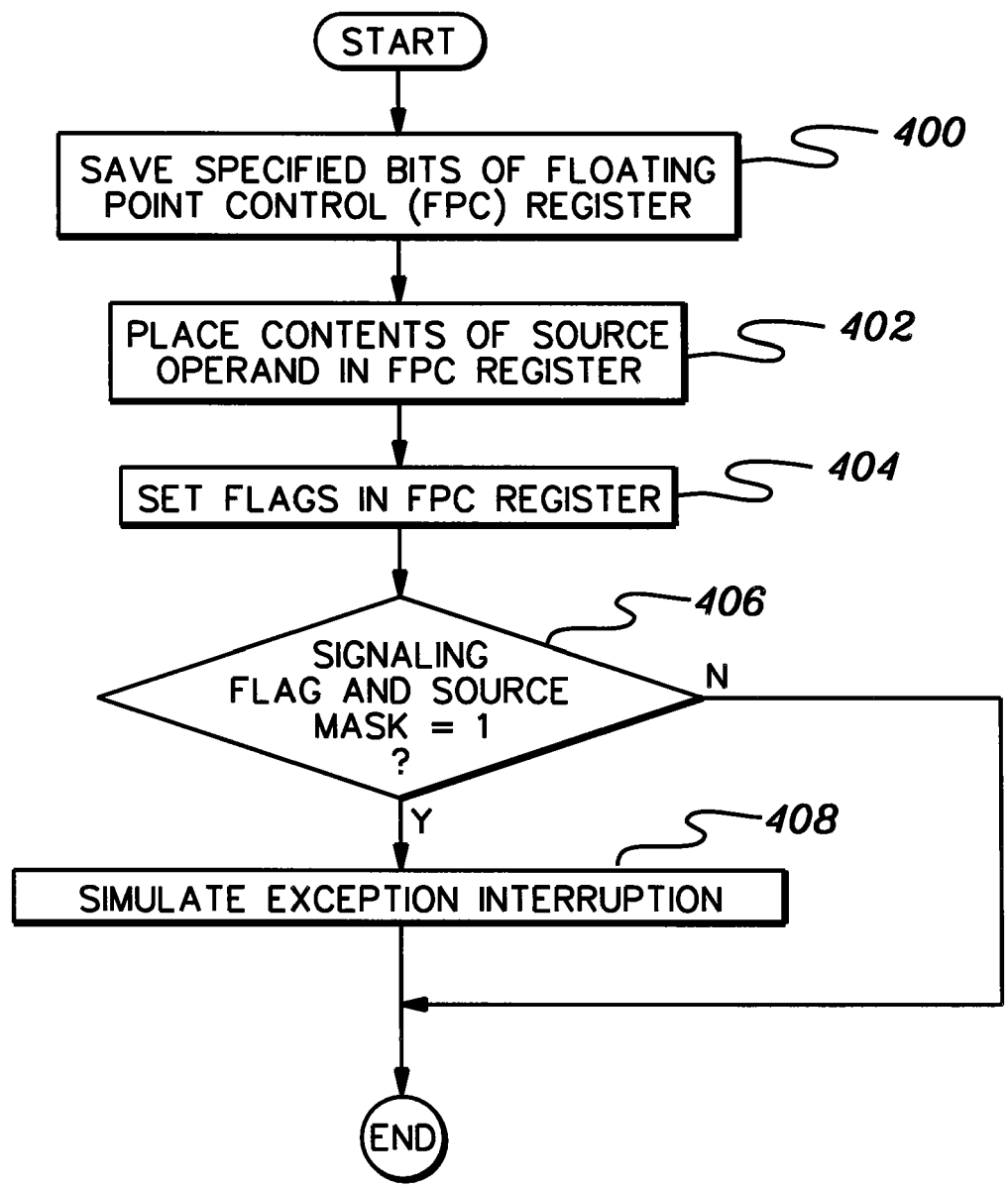
FIG. 4 depicts one embodiment of the logic associated with executing the Load FPC and Signal instruction (or a Set FPC and Signal instruction), in accordance with an aspect of the present invention.

The FPC register is used during operation of the Load FPC and Signal instruction. One embodiment of the logic associated with the Load FPC and Signal instruction is described with reference to FIG. 4.

At the beginning of the operation, specified bits of the floating point control register are saved, STEP 400. For instance, bits 0-4 of byte 1 of the floating point control register are preserved to be used as signaling flags. The signaling flags are an indication of whether an exception occurred during execution of the software implemented function.

Additionally, the contents of the source operand are placed in the floating point control register, STEP 402. For example, the contents of the source operand designated by $B_2 D_2$ are placed into the floating point control register. Further, the flags in the floating point control register are set to the logical OR of the signaling flags (those saved in STEP 400) and the source flags (those of the source operand), STEP 404. The source flags are a copy of the flags (e.g., bits 0-4 of byte 1) prior to simulation of the function. This copy is made by the simulated software routine at the beginning of the routine.

Thereafter, an examination is made of the conditions for which exception interruption (e.g., IEEE exception trap action) are to be simulated. For instance, a determination is made as to whether any signaling flag and its corresponding source mask are 1, INQUIRY 406. If a signaling flag and its corresponding source mask are one, then a simulated exception interruption occurs, STEP 408. Otherwise, an interruption is not invoked. In particular, if no signaling flag is enabled, the DXC in the floating point control register remains as loaded from the source and instruction execution completes with no interruption. This enables the flow of the routine to remain in mainline processing. The signaling flags in the FPC register indicate whether an exception occurred, and if so, the particular exception.

Figure 5:
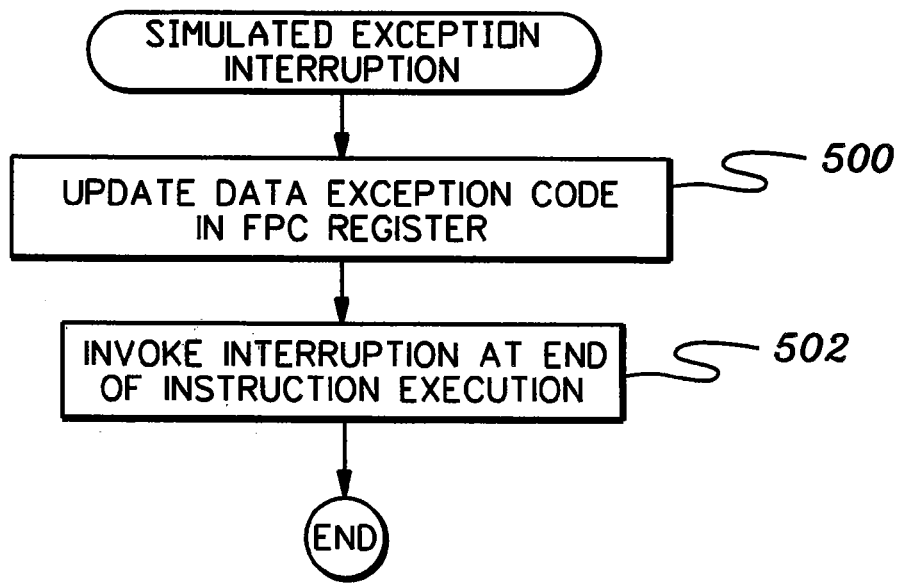
FIG. 5 depicts one embodiment of the logic associated with simulating an exception interruption, in accordance with an aspect of the present invention.

Further details regarding simulated exception interruption are described with reference to FIG. 5. Referring to FIG. 5, for an interrupt, the data exception code (DXC) in the floating point control register is updated to indicate the specific cause of the interruption, STEP 500. One example of the encoding of the DXC is as follows:

| Enabled[1] Signaling Flags Bit | | | | | DXC |
|---|---|---|---|---|---|
| 0 | 1 | 2 | 3 | 4 | (Binary) |
| 1 | — | — | — | — | 1000 0011 |
| 0 | 1 | — | — | — | 0100 0011 |
| 0 | 0 | 1 | — | — | 0010 w011 |
| 0 | 0 | 0 | 1 | — | 0001 w011 |
| 0 | 0 | 0 | 0 | 1 | 0000 1011 |

Explanation:
[1] The logical AND of the corresponding bit in the source masks and the signaling flags.
— Don't care.
w Bit 4 of the signaling flag.

When any of bits 0-5 in the DXC are non-zero and the two rightmost bits of the DXC are set (e.g., are one), then in accordance with an aspect of the present invention, an indication is provided that the exception occurred during processing of a software implemented routine. This information is useful to those handlers responsible for the exception and/or interrupt caused by the exception.

Examples of data exception codes (in Hex) are shown in the below table, which includes both simulated interruptions (e.g., 0B, 13, 1B, 23, 2B, 43 and 83) and hardware generated interruptions.

| DXC (Hex) | Data Exception |
|---|---|
| 00 | Decimal operand |
| 01 | AFP register |
| 02 | BFP instruction |
| 03 | DFP instruction |
| 08 | IEEE inexact and truncated |
| 0B | Simulated IEEE inexact |
| 0C | IEEE inexact and incremented |
| 10 | IEEE underflow, exact |
| 13 | Simulated IEEE underflow, exact |
| 18 | IEEE underflow, inexact and truncated |
| 1B | Simulated IEEE underflow, inexact |
| 1C | IEEE underflow, inexact and incremented |
| 20 | IEEE overflow, exact |
| 23 | Simulated IEEE overflow, exact |

-continued

| DXC (Hex) | Data Exception |
|---|---|
| 28 | IEEE overflow, inexact and truncated |
| 2B | Simulated IEEE overflow, inexact |
| 2C | IEEE overflow, inexact and incremented |
| 40 | IEEE division by zero |
| 43 | Simulated IEEE division by zero |
| 80 | IEEE invalid operation |
| 83 | Simulated IEEE invalid operation |

In addition to setting the data exception code, a program interruption is invoked at completion of instruction execution, STEP 502. This completes processing of the Load FPC and Signal instruction.

One example of the results of executing the Load FPC and Signal instruction is depicted below:

|  | Resulting FPC Register Contents | | | | |
|---|---|---|---|---|---|
| Interruption | Masks | Flags | DXC | DRM | BRM |
| No | S | OR | S | S | S |
| Yes | S | OR | Xg | S | S |

Explanation:
BRM    BFP rounding mode
DRM    DFP rounding mode
DXC    Data exception code
OR    Set to the logical OR of signaling flags and source flags.
S    Set to the contents of the corresponding field in the source operand.
Interruption    Simulated IEEE exception interruption action. This action occurs when the logical AND of the signaling flags and source masks is nonzero.
Xg    DXC for simulated IEEE exception.

Bits in the source operand that correspond to unsupported bit positions in the FPC register are zero; otherwise, a specification exception is recognized.

In addition to the Load FPC and Signal instruction, a Set instruction may also be used. The Set instruction operates similarly to the Load instruction; however, the Load instruction uses storage for the source operand and the Set instruction uses a register.

Figure 6:
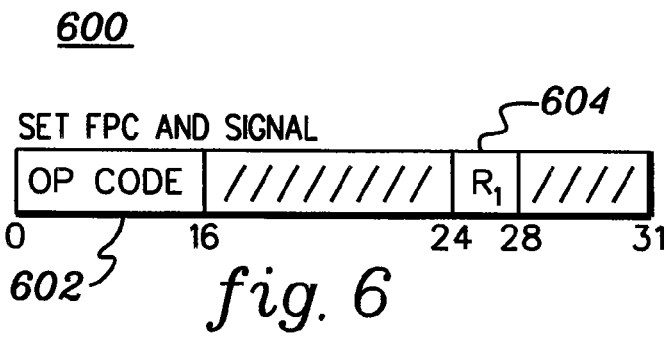
FIG. 6 depicts one embodiment of a format of a Set FPC and Signal instruction used in accordance with an aspect of the present invention.

One example of a Set FPC and Signal instruction is described with reference to FIG. 6. In this example, a Set FPC and Signal instruction 600 is a 32-bit instruction that is in the RRE format (register and register operation having an extended opcode) as that format is specified in the IBM® z/Architecture Principles of Operations. It includes, for instance:

An operation code 602 (e.g., bits 0-15) designating the Set FPC and Signal instruction; and A register field 604 (e.g., R$_1$, bits 24-27) designating a register, the contents of which are the source operand used by the instruction. The source operand is in bits 32-63 of the general register designated by R$_1$; bits 0-31 of the general register are ignored.

As with the Load FPC and Signal instruction, at the beginning of the Set FPC and Signal operation, bits 0-4 of byte 1 of the floating point control (FPC) register are preserved to be used as signaling flags. Next, the contents of the source operand are placed in the FPC register. Then, the flags in the FPC register are set to the logical OR of the signaling flags and the source flags. Finally, the conditions for simulated exception interruption are examined.

If any signaling flag is one and the corresponding source mask is also one, simulated exception interruption occurs. The data exception code (DXC) in the FPC register is updated to indicate the specific cause of the interruption (as described above). The DXC also indicates that this is a simulated exception. Moreover, a data exception program interruption occurs at completion of the instruction execution.

If no signaling flag is enabled, the DXC in the FPC register remains as loaded from the source, and instruction execution completes with no interruption.

Bits in the source operand that correspond to unsupported bit positions in the FPC register are zero; otherwise, a specification exception is recognized.

Results of this instruction are the same as those described above with reference to the Load instruction.

The exception simulation instructions (e.g., Load FPC and Signal and Set FPC and Signal) are provided to facilitate program simulation of functions (e.g., IEEE functions, operations, etc.) not provided directly in the machine. These instructions permit the simulation routine to restore the caller's masks, flags, and rounding modes; and, when appropriate, to simulate exceptions (e.g., IEEE exceptions), including interruption when enabled.

On entry, the simulation routine first saves the FPC register contents (including the caller's masks, flags, and rounding modes), disables all interruptions, clears all flags, establishes appropriate rounding modes, and then performs the necessary floating point operations, as one example. Finally, the routine sets the current flags (called signaling flags) appropriately, and invokes either Load FPC and Signal or Set FPC and Signal.

When a program interruption for a data exception occurs, and both bits 6 and 7 of the DXC are ones and any of bits 0-5 of the DXC are non-zero, it indicates to the interruption handler that the interruption was caused by a simulated exception interruption. Bits 0-5 of the DXC indicate the type of exception, as shown, for example, in the above table. Additional information required by an interruption handler can be determined by the contents of an interruption information block, located by convention, at a fixed offset from the location where the instruction causing the interruption resides.

The following shows an example of this scheme. In the following example, the Load FPC and Signal (LFAS) instruction is used, and the caller's FPC register contents are at the location, SAVEDFPC. The interruption information block is inserted immediately preceding the Load FPC and Signal instruction, and an unconditional branch precedes that to branch around the information block. When an interruption occurs, the instruction address stored in the old PSW points to the instruction immediately following the Load FPC and Signal instruction. Therefore, the information block has a fixed offset to this instruction address.

|  | BC 15,LOADFPC |
|---|---|
|  | Interruption Information Block |
| LOADFPC | LFAS SAVEDFPC |

The interruption information block can include the designation of floating point registers and general registers containing the information (or addresses of the information) for the following types of items:

a. The operation being simulated;
b. Format and values of source operands;
c. Format and value of the result; and
d. Any additional information useful to the interruption handler.

Described in detail above is an exception simulator, including the Load FPC and Signal instruction and the SET FPC and Signal instruction, employed to simulate exceptions when exceptions occur in functions implemented in software, and to invoke interruptions, when appropriate.

Figure 7:
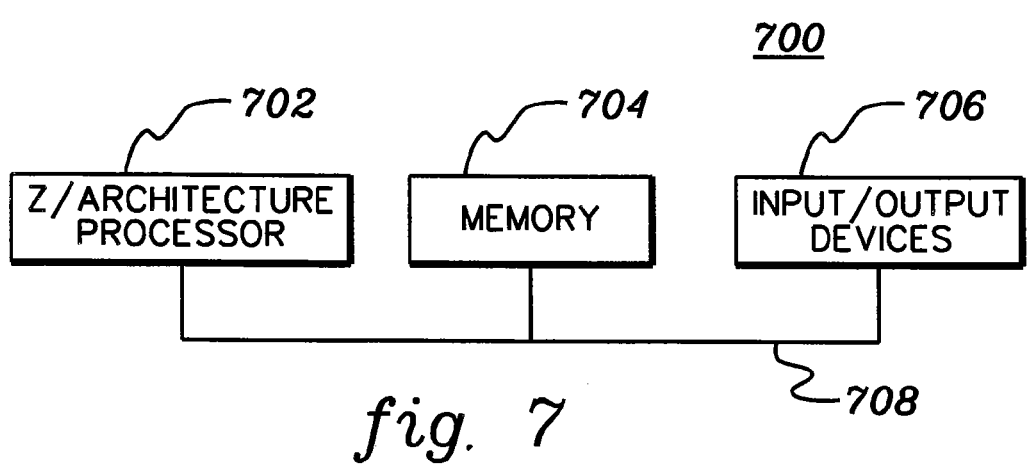
FIG. 7 depicts one embodiment of a processing environment to incorporate and use one or more aspects of the present invention.

One embodiment of a processing environment to incorporate and use one or more of these instructions and/or one or more aspects of the present invention is described with reference to FIG. 7. Processing environment 700 includes, for instance, a z/Architecture® processor 702 (e.g., a central processing unit (CPU)), a memory 704 (e.g., main memory), and one or more input/output (I/O) devices 706 coupled to one another via, for example, one or more buses 708 and/or other connections.

In the example shown, z/Architecture® processor 702 is a part of a System z™ server, offered by International Business Machines Corporation (IBM®), Armonk, N.Y. System z® servers implement IBM's z/Architecture®, which specifies the logical structure and functional operation of the computer. One embodiment of the z/Architecture is described in "z/Architecture Principles of Operation". The System Z™ server executes an operating system, such as z/OS®, also offered by International Business Machines Corporation. IBM® and z/OS® are registered trademarks of International Business Machines Corporation, Armonk, N.Y., USA. Other names used herein may be registered trademarks, trademarks or product names of International Business Machines Corporation or other companies.

In another embodiment, the instructions and/or the logic of the instructions can be executed in a processing environment that is based on one architecture (which may be referred to as a "native" architecture), but emulates another architecture (which may be referred to as a "guest" architecture). In such an environment, for example, the Load FPC and Signal instruction, and/or the Set FPC and Signal instruction and/or logic thereof, which are specified in the z/Architecture® and designed to execute on a z/Architecture® machine, are emulated to execute on an architecture other than the z/Architecture®. One example of this processing environment is described with reference to FIGS. 8-9.

Figure 8:
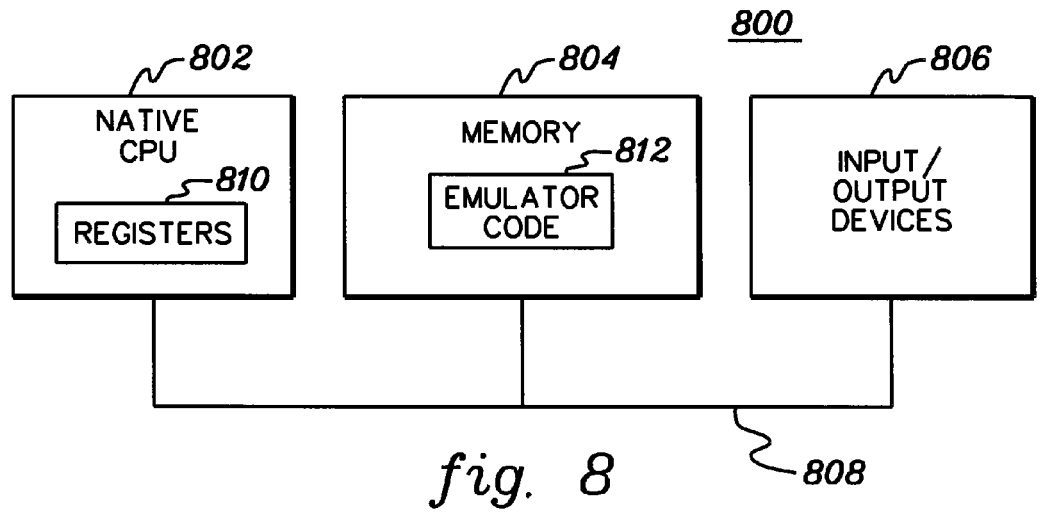
FIG. 8 depicts another embodiment of a processing environment to incorporate and use one or more aspects of the present invention.

Referring to FIG. 8, one embodiment of a processing environment to incorporate and use one or more aspects of the present invention is described. Processing environment 800 includes, for instance, a native central processing unit 802, a memory 804 (e.g., main memory) and one or more input/output (I/O) devices 806 coupled to one another via, for example, one or more buses 808 and/or other connections. As examples, processing environment 800 may include a Power PC® processor, a pSeries® server, or an xSeries® server offered by International Business Machines Corporation, Armonk, N.Y.; an HP Superdome with Intel® Itanium® 2 processors offered by Hewlett-Packard Company, Palo Alto, Calif.; and/or other machines based on architectures offered by IBM®, Hewlett-Packard, Intel®, Sun Microsystems or others. Power PC®, pSeries® and xSeries® are registered trademarks of International Business Machines Corporation, Armonk, N.Y., U.S.A. Intel® and Itanium® 2 are registered trademarks of Intel Corporation, Santa Clara, Calif.

Native central processing unit 802 includes one or more native registers 810, such as one or more general purpose registers and/or one or more special purpose registers, used during processing within the environment. These registers include information that represent the state of the environment at any particular point in time.

Moreover, native central processing unit 802 executes instructions and code that are stored in memory 804. In one particular example, the central processing unit executes emulator code 812 stored in memory 804. This code enables the processing environment configured in one architecture to emulate another architecture. For instance, emulator code 812 allows machines based on architectures other than the z/Architecture®, such as Power PC® processors, pSeries® servers, xSeries® servers, HP Superdome® servers, or others to emulate the z/Architecture® and to execute software and instructions developed based on the z/Architecture®.

Figure 9:
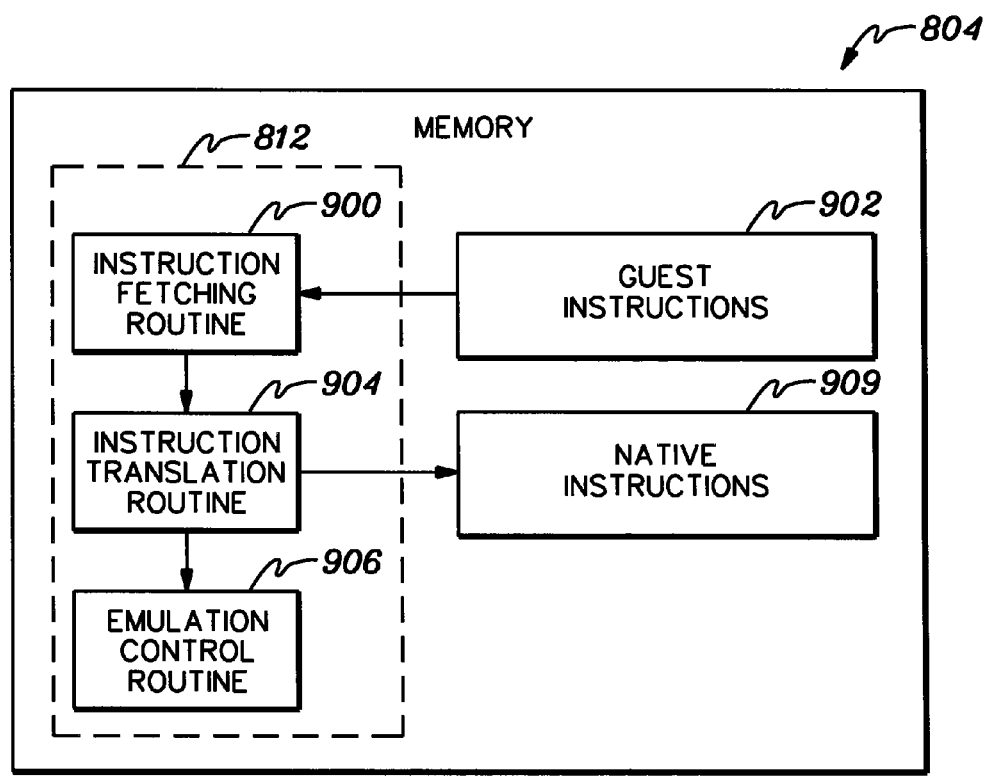
FIG. 9 depicts further details of the memory of FIG. 8, in accordance with an aspect of the present invention.

Further details relating to emulator code 812 are described with reference to FIG. 9. Guest instructions 902 comprise software instructions (e.g., machine instructions) that were developed to be executed in an architecture other than that of native CPU 802. For example, guest instructions 902 may have been designed to execute on z/Architecture® processor 702, but are instead being emulated on native CPU 802 (which may be for example an Intel® Itanium® 2 processor). In one example, emulator code 812 includes an instruction fetching routine 900 to obtain one or more guest instructions 902 from memory 804, and to optionally provide local buffering for the instruction obtained. It also includes an instruction translation routine 904 to determine the type of guest instruction that has been obtained and to translate the guest instruction into one or more corresponding native instructions 909. This translation includes, for instance, identifying the function to be performed by the guest instruction and choosing the native instructions to perform that function.

Further, emulator 812 includes an emulation control routine 906 to cause the native instructions to be executed. Emulation control routine 906 may cause native CPU 802 to execute a routine of native instructions that emulate one or more previously obtained guest instructions and, at the conclusion of such execution, to return control to the instruction fetch routine to emulate the obtaining of the next guest instruction or group of guest instructions. Execution of the native instructions 909 may include loading data into a register from memory 804; storing data back to memory from a register; or performing some type of arithmetic or logical operation, as determined by the translation routine.

Each routine is, for instance, implemented in software, which is stored in memory and executed by the native central processing unit 802. In other examples, one or more of the routines or operations are implemented in firmware, hardware, software or some combination thereof. The registers of the emulated guest processor may be emulated using the registers 810 of the native CPU or by using locations in memory 804. In embodiments, the guest instructions 902, native instructions 909, and emulation code 812 may reside in the same memory or may be dispersed among different memory devices.

In one example, a guest instruction 902 that is obtained, translated and executed is the Load FPC and Signal instruction, the Set FPC and Signal instruction or similar instruction. The Load or Set instruction, which is a z/Architecture® instruction in this example, is fetched from memory, translated and represented as a sequence of native instructions 909 (e.g., Power PC®, pSeries®, xSeries®, Intel®, etc.) which are executed.

In another embodiment, one or more of the instructions are executed in another architecture environment including, for example, an architecture as described in the "INTEL® 64 and IA-32 Architectures Software Developer's Manual Volume 1," Order Number 253665-022US, November 2006;

"INTEL® 64 and IA-32 Architectures Software Developer's Manual Volume 2A," Order Number 253666-022US, November 2006; the "INTEL® Itanium® Architecture Software Developer's Manual Volume 1," Doc. No. 245317-005, January 2006; the "INTEL® Itanium® Architecture Software Developer's Manual Volume 2," Doc. No. 245318-005, January 2006; and/or the "INTEL® Itanium® Architecture Software Developer's Manual Volume 3," Doc. No. 245319-005, January 2006; each of which is hereby incorporated herein by reference in its entirety.

In yet a further embodiment, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a system (e.g., computer system) or sold separately.

Figure 10:
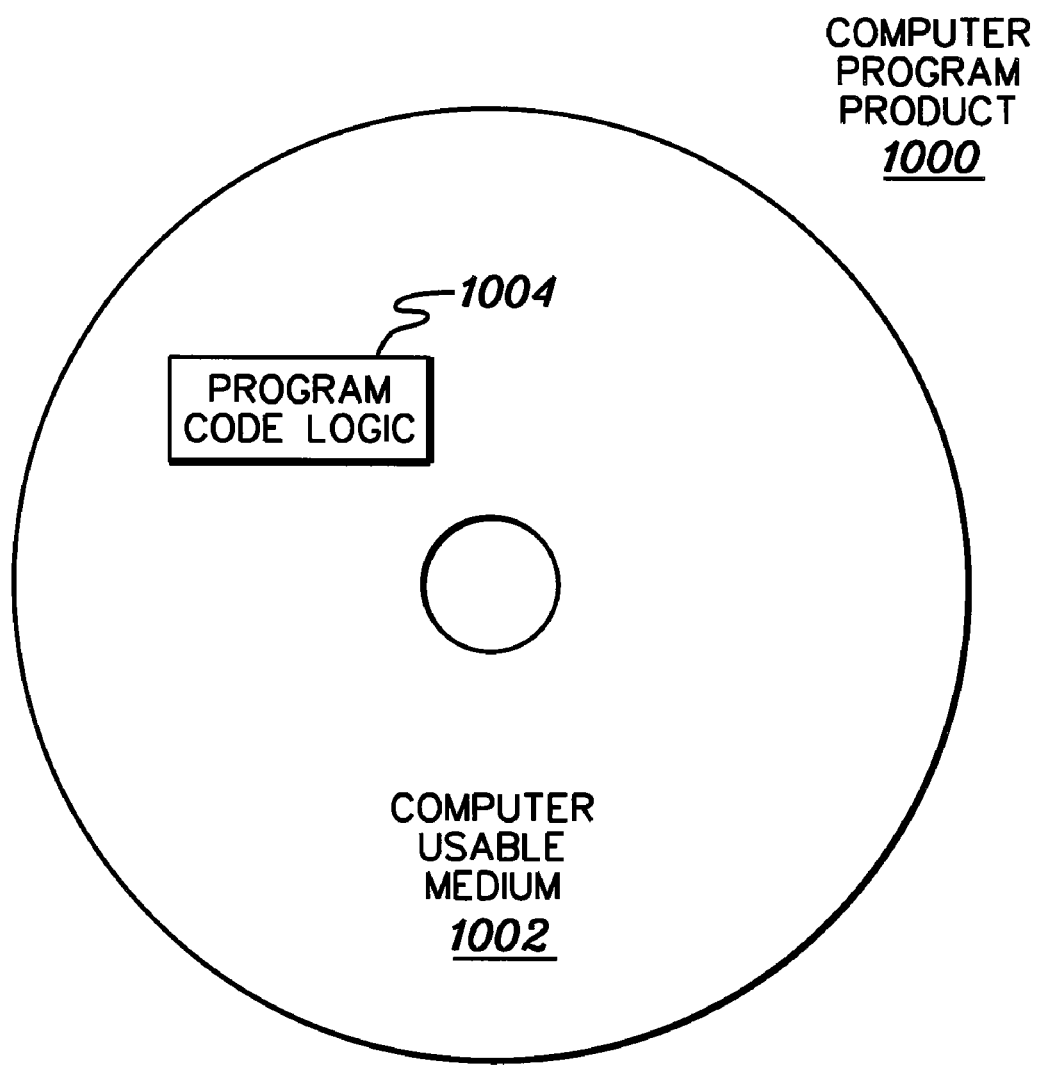
FIG. 10 depicts one embodiment of a computer program product incorporating one or more aspects of the present invention.

One example of an article of manufacture or a computer program product incorporating one or more aspects of the present invention is described with reference to FIG. 10. A computer program product 1000 includes, for instance, one or more computer usable media 1002 to store computer readable program code means or logic 1004 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for simulating exceptions that occur in software implemented routines. Further, a capability is provided for simulating exception interruptions. This capability facilitates the providing of functions required by the IEEE floating point standard (IEEE 854), by enabling those functions and associated exception handling to be provided in software.

Further, advantageously, by indicating on an interruption that the exception is simulated, the handler of the interruption will not take needless steps, such as attempting to re-execute the instruction causing the interrupt, since there is no instruction.

Yet further, advantageously, an interruption is enabled without causing unwanted or additional interruptions.

Although one or more examples have been provided herein, these are only examples. Many variations are possible without departing from the spirit of the present invention. For instance, processing environments other than the examples provided herein may include and/or benefit from one or more aspects of the present invention. As an example, a processor can be other than an IBM® System z™ processor and can execute an operating system other than z/OS®. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

Additionally, one or more of the instructions can include other registers or entities other than registers to designate information. Further, although examples of registers are described above, each of the registers may include more, less or different information. Further, each may include additional data not necessarily needed in one or more aspects of the present invention. Specific location within the registers for the information is implementation and/or architecture dependent. Yet further, different data and/or positioning within the registers and/or entities are possible. Moreover, more, less or different flags, masks, etc. may be used.

Still further, one or more aspects of the present invention can be usable with floating point systems, including decimal and binary floating point systems, as well as other floating point systems or non-floating point systems. One or more aspects of the present invention also apply to implementations using BID (Binary Encoded Decimal Floating Point data) encoding, as well as other encoding.

In an embodiment wherein the significand is Binary Encoded Decimal (BID) format rather than DPD, the BID significand is decoded to a decimal value, such as packed decimal, for example, such that each decimal digit is represented by a distinct 4 bit value. The decimal value is operated on according to the function required and the result is re-encoded into the BID format, thereby the BID significand is operated on as a decimal number rather than a binary number. In one example, the function required is a shift operation on the significand. The shift operation is performed on the decimal number such that the value of the decimal number is shifted by a predetermined number of decimal digit positions. The shifted value is then encoded into BID format and saved as a result operand.

As used herein, the term "obtaining" as in, for instance, "obtaining an instruction" includes, but is not limited to, fetching, receiving, having, providing, being provided, creating, developing, etc. Further, although flags are described herein, other indicators may be used.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention, and these are, therefore, considered to be within the scope of the invention as defined in the claims.

What is claimed is:

1. A computer program product for executing a machine instruction in a central processing unit, the computer program product comprising:
    a computer readable storage medium readable by a processor and storing instructions for execution by the processor for performing a method comprising:
        obtaining a machine instruction for execution, the machine instruction being defined for computer execution according to a computer architecture, the machine instruction comprising an opcode; and
        performing a function defined by the opcode of the machine instruction, said function comprising:
            saving a portion of a control register to be used as one or more signaling indicators;
            placing contents of a source operand designated by the machine instruction in the control register;
            determining whether an interruption is to be invoked;
            providing an indication of an exception, in response to determining that the interruption is to be invoked, said indication specifying that the exception is a simulated exception for a routine simulating an operation; and
            providing a status indication, in response to determining that an interruption is not to be invoked, the status indication specifying an exception if an exception was indicated by the routine.

2. The computer program product of claim 1, wherein the method further comprises invoking the interruption, in response to determining that the interruption is to be invoked.

3. The computer program product of claim 1, wherein the determining comprises checking whether a signaling indicator of the one or more signaling indicators and its corresponding source mask of a source operand are set, wherein a set signaling indicator and corresponding source mask indicates an interruption is to be invoked.

4. The computer program product of claim 1, wherein the providing the indication of the exception comprises updating a data exception code in the control register.

5. The computer program product of claim 1, wherein the providing a status indication comprises setting one or more indicators in the control register, wherein the setting of an indicator of the one or more indicators comprises setting the indicator in the control register to the logical OR of its corresponding signaling indicator and source indicator of a source operand.

6. The computer program product of claim 5, wherein the machine instruction comprises a register field, and the source operand is in specified bits of a register designated by the register field.

7. The computer program product of claim 6, wherein the machine instruction has an RRE format and comprises 32 bits, and wherein the opcode comprises bits 0-15 and the register field comprises bits 24-27.

8. The computer program product of claim 1, wherein the control register comprises a floating point control register, and the portion of the control register that is saved to be used as one or more signaling indicators comprises bits 0-4 of byte 1 of the floating point control register.

9. The computer program product of claim 1, wherein the exception comprises one of an invalid operation, divide by zero, overflow, underflow and inexact.

10. The computer program product of claim 1, wherein the machine instruction comprises a base field and a displacement value, and a source operand is designated by an address defined by the base field and the displacement value.

11. The computer program product of claim 10, wherein the machine instruction has an S format and comprises 32 bits, and wherein the opcode comprises bits 0-15, the base field comprises bits 16-19, and the displacement field comprises bits 20-31.

12. The computer program product of claim 1, wherein the computer architecture is the IBM z/Architecture.

13. The computer program product of claim 1, wherein the computer readable program code logic is emulator code.

14. A method of executing a machine instruction in a central processing unit, said method comprising:
    obtaining a machine instruction for execution, the machine instruction being defined for computer execution according to a computer architecture, the machine instruction comprising an opcode; and
    performing a function defined by the opcode of the machine instruction, said function comprising:
        saving a portion of a control register to be used as one or more signaling indicators;
        placing contents of a source operand designated by the machine instruction in the control register;
        determining whether an interruption is to be invoked;
        providing an indication of an exception, in response to determining that the interruption is to be invoked, said indication specifying that the exception is a simulated exception for a routine simulating an operation; and
        providing a status indication, in response to determining that an interruption is not to be invoked, the status indication specifying an exception if an exception was indicated by the routine.

15. The method of claim 14, further comprising invoking the interruption, in response to determining that the interruption is to be invoked.

16. The method of claim 14, wherein the determining comprises checking whether a signaling indicator of the one or more signaling indicators and its corresponding source mask of a source operand are set, wherein a set signaling indicator and corresponding source mask indicates an interruption is to be invoked.

17. The method of claim 14, wherein the providing the indication of the exception comprises updating a data exception code in the control register.

18. The method of claim 14, wherein the providing a status indication comprises setting one or more indicators in the control register, wherein the setting of an indicator of the one or more indicators comprises setting the indicator in the control register to the logical OR of its corresponding signaling indicator and source indicator of a source operand.

19. The method of claim 18, wherein the machine instruction comprises a base field and a displacement value, and the source operand is designated by an address defined by the base field and the displacement value.

20. The method of claim 18, wherein the machine instruction comprises a register field, and the source operand is in specified bits of a register designated by the register field.

21. A system of executing a machine instruction in a central processing unit, said system comprising:
    a memory;

a processor to obtain a machine instruction for execution from the memory, the machine instruction being defined for computer execution according to a computer architecture, the machine instruction comprising an opcode; and the processor to perform a function defined by the opcode of the machine instruction, said function comprising:

saving a portion of a control register to be used as one or more signaling indicators;

placing contents of a source operand designated by the machine instruction in the control register;

determining whether an interruption is to be invoked;

providing an indication of an exception, in response to determining that the interruption is to be invoked, said indication specifying that the exception is a simulated exception for a routine simulating an operation; and providing a status indication, in response to determining that an interruption is not to be invoked, the status indication specifying an exception if an exception was indicated by the routine.

22. The system of claim 21, wherein the determining comprises checking whether a signaling indicator of the one or more signaling indicators and its corresponding source mask of a source operand are set, wherein a set signaling indicator and corresponding source mask indicates an interruption is to be invoked.

23. The system of claim 21, wherein the providing the indication of the exception comprises updating a data exception code in the control register.

24. The system of claim 21, wherein the machine instruction is in a format of one architecture and is emulated to execute on a processor having another architecture, said another architecture being different from said one architecture.

* * * * *